Nov. 6, 1934.   T. A. MITCHELL   1,979,281
METHOD OF CHLORIDIZING ORES
Filed Sept. 1, 1933
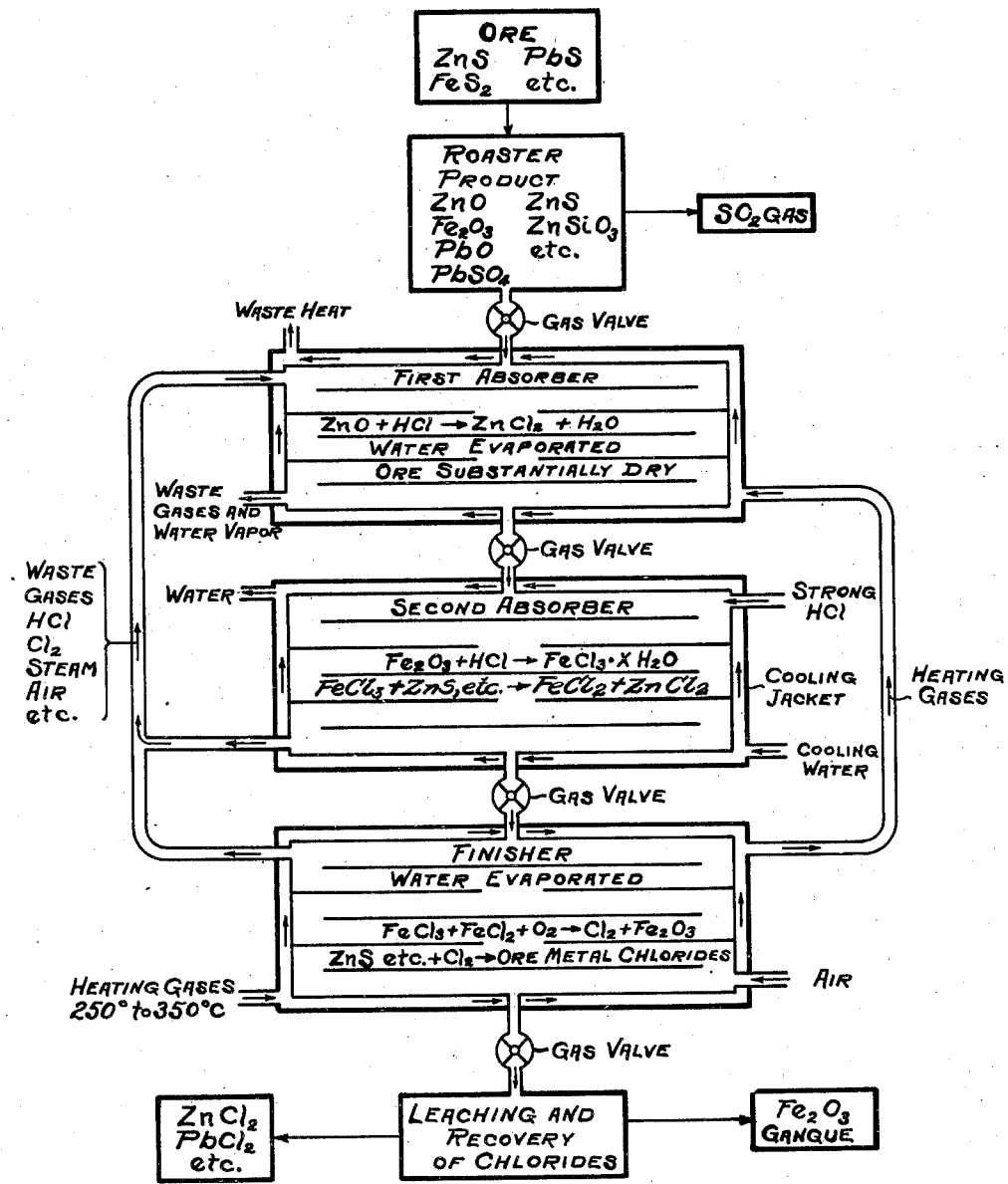
Inventor
THOMAS A. MITCHELL Patented Nov. 6, 1934

1,979,281

UNITED STATES PATENT OFFICE 1,979,281

METHOD OF CHLORIDIZING ORES

Thomas A. Mitchell, Denver, Colo., assignor, by mesne assignments, to Hughes-Mitchell Processes, Incorporated, Denver, Colo., a corporation of Wyoming Application September 1, 1933, Serial No. 687,827
In Canada April 8, 1932

27 Claims. (Cl. 75—67)

This invention relates to a method of chloridizing simple or complex sulfide ores, which may be either low grade ores associated with large quantities of undesirable gangue or concentrates containing high percentages of ore values, and particularly the complex zinc sulfide ores, as well as other complex ores containing zinc, iron, lead, copper, silver, gold, manganese, tin, cobalt, nickel, cadmium, vanadium, or other desired metals.

The primary object of this invention is to provide a simple and efficient method of chloridizing such sulfide ores by a series of steps, following a preliminary roasting operation, which may be carried on at a comparatively low temperature and with the ore material in a substantially dry, granular condition, so that the desired metals may be successively removed by suitable leaching operations and recovered as soluble chlorides and thus be separated from the gangue and other undesired ingredients.

In accordance with this invention, a low temperature chloridization of the oxides of a roasted sulfide ore may be effected by treatment of the ore in a substantially dry condition with gaseous agents, such as hydrochloric acid gas, chlorine and other suitable agents; and the refractory or difficultly chloridized compounds, such as the residual sulfides and silicates or compounds of zinc and iron, may be converted to chlorides by means of iron chloride, and particularly by ferric chloride in intimate association with the ore and by nascent chlorine developed therefrom. These steps are carried on efficiently and economically by providing the roasted ore material with iron oxide, and converting the latter to ferric chloride during a low temperature stage of chloridizing the ore metal oxides and thereafter heating the ore to remove the combined chlorine from the iron chloride.

Ferric chloride is not efficiently produced under those conditions which are best adapted for the treatment of zinc and other metal oxides, and particularly since it is not stable in the presence of zinc oxide or in the presence of oxygen at a temperature of about 100° C., and since the hydrated chloride melts in its water of crystallization at a temperature of about 90° C., which is suitable for making zinc chloride. Also, when the oxides are treated with hydrochloric acid gas, water is formed; and the condensation thereof on a dry ore during the stage of forming a chloride, such as ferric chloride which must ordinarily be made at a temperature below that at which some water will condense, can so wet the ore as to interfere seriously with the penetration of the gases. This problem is particularly serious for a high grade zinc ore, since zinc chloride is deliquescent and tends to absorb water from the atmosphere or the ore material and to form a viscous, syrupy or lumpy mass which is not easily permeated by gases. Hence, it is desirable to chloridize the oxides in two stages, so that the reactions as well as the physical condition of the ore may be controlled. Furthermore, iron chloride may be decomposed under the influence of heat to form chlorine by reaction with oxygen, or to form the relatively weak reagent, hydrochloric acid, by reaction with water. It is desirable to control the water content of the ore so as to cause the formation of the powerful chloridizer, nascent chlorine, as well as to keep the ore material in proper condition throughout the process for an efficient treatment.

Various other conditions of the process must be controlled, as herein explained. For example, when a sulfide ore is roasted with air at a temperature high enough to form oxides only, there is a tendency for the ore to sinter or fuse, and particularly when the ore is high in silicates, as well as to form difficultly chloridized compounds, such as the silicate, ferrate, or ferrite of zinc; hence, such a roasted material is difficultly penetrated by reagent gases, and chloridization is not efficient or complete. This process, therefore, involves roasting the ore at a low temperature and incompletely, and yet serves efficiently for solubilizing the ore metal values and, if desired, converting them solely to chlorides, although sulfates and sulfides, as well as oxides, may be present in the roasted material.

A further object of this invention is, therefore, to provide a practicable method of chloridizing ore metal oxides or roasted sulfide ores, and particularly the ores containing zinc, which is so carried on and controlled that the water of reaction cannot wet the ore material detrimentally and any deliquescent zinc chloride present cannot produce a viscous, syrupy or lumpy condition, whereby the ore remains in a substantially dry condition and may be readily penetrated by the gaseous reagents employed in the process.

Another object is to provide a method of so treating a complex ore material containing iron sulfide or oxide that ferric chloride is formed in intimate association with the other ore values and serves to react directly therewith and particularly with the refractory compounds, such as residual sulfides, and convert them to chlorides.

A further object is to so carry on such a process that the ferric chloride is caused to give up its combined chlorine in the nascent condition and the formation of hydrochloric acid therefrom is minimized.

A still further object is to provide a simple and efficient process of treating simple or complex sulfide ores in accordance with which they may be roasted under comparatively low temperature conditions and thereafter chloridized by means of ferric chloride and gaseous agents derived therefrom and yet be recovered as chlorides substantially free from the soluble iron chlorides. Further objects will be apparent in the following disclosure.

In the preferred practice of this invention, a dry roasted sulfide ore is treated in a first or warm absorber stage with chloridizing gases, such as chlorine, hydrochloric acid etc., or preferably with the weak gases derived from the later stages of the process. During this stage, the temperature and atmospheric conditions are so controlled, without reference to the formation or decomposition of ferric chloride, that zinc and other ore metal chlorides are formed from their oxides and the ore material is kept in a substantially dry, granular condition. Thereafter, the material, which has been provided with sufficient ferric oxide for the purpose, is treated in a second absorber stage under conditions which are favorable to the formation of ferric chloride, and to the maintenance of the material in a granular condition. The conversion of ferric oxide to a chloride is accomplished by means of hydrochloric acid gas, and preferably in a strong atmosphere thereof, while the heat of reaction is dissipated, as by means of a cooling medium, and the temperature is held sufficiently low and the atmosphere is controlled so that crystalline, hydrated ferric chloride may be formed and remain in a substantially dry condition in the ore material. Under the conditions of this low temperature or cooled absorber stage, the ferric chloride reacts directly with the residual sulfides or other refractory ore values and converts a considerable portion of them to chlorides, with the resultant lowering of valency of some of the reagent to ferrous chloride.

The third or finisher stage of the process, which may be omitted for some types of ores that have been sufficiently chloridized in the second stage, comprises heating the ore material to a temperature at which the ferric and ferrous chlorides are not stable, and in the presence of air supplied in quantity sufficient to form nascent chlorine therewith and convert the soluble iron chlorides to the insoluble ferric oxide, while the water vapor is removed and prevented from forming any large amount of hydrochloric acid. This water vapor and the waste gases, as well as the heat thereof, are prevented from contacting with the ore during the second stage while the ferric chloride is being formed, whereby the material may be kept substantially dry and granular during that stage.

As an example of the process, which is illustrated in the accompanying diagrammatic drawing, one may treat as follows a complex concentrated or low grade zinc sulfide ore or an oxidized ore containing metal values peculiar to these ores, such as zinc, lead and iron sulfides. The iron sulfide may be present, or iron sulfide or oxide may be added, in amount sufficient for chloridizing the refractory values. If a sulfide ore is used, it is so roasted as to convert the iron sulfide into ferric oxide, as well as to convert a considerable portion of the zinc sulfide to the oxide, with or without some sulfate, as the case may be.

It is desirable that the ore material remain in a pulverulent, gas-permeable condition throughout the entire process. Hence, the roasting operation is preferably so carried on as to prevent the material from being sintered or fused or otherwise rendered difficultly treatable by gases and leaching reagents. Various expedients may be employed for this purpose. For example, a sulfide ore may be roasted, if desired, in intimate mixture with 5% or more of a suitable alkaline earth metal oxide, hydroxide or carbonate, such as the oxides of calcium, strontium or barium, which are capable of causing the ore to remain in a pulverulent, non-sintered condition and to prevent the formation of zinc sulfate, as explained in my Patent No. 1,943,331, dated January 16, 1934. The roasting operation is ordinarily carried on at as low a temperature as is feasible to burn off the sulfide sulfur, and preferably autogenously, if sufficient sulfide sulfur is present; but, if there is not sufficient sulfur for the purpose, an outside source of heat, such as a gas or oil flame, may be employed to maintain the desired temperature. A considerable amount of sulfide sulfur, such as 5% or more, may be left in the product. It, however, is desirable to maintain oxidizing conditions and convert the iron to the ferric oxide condition. If there is not enough iron oxide in the product as required for the chloridizing stage, then iron sulfide or oxide or other suitable compound may be added at the proper stage. The roasted product will contain zinc and ferric oxides, lead oxide and sulfate, residual sulfides and silicates, and/or oxygen compounds of zinc and iron. If the ore is roasted with lime, the sulfate radical that would otherwise remain as zinc sulfate is present as calcium sulfate. Copper and tin sulfides are likewise prevented from forming sulfates.

If the ore is roasted without the alkaline earth, then the zinc, tin and copper sulfates formed during roasting may be converted to chlorides by chloridizing the ore in the presence of an alkaline earth metal compound, such as the oxide or the chloride of calcium, strontium or barium, which is capable of and is proportioned for fixing the available sulfate radical as an insoluble alkaline earth metal sulfate, as described and claimed in my Patents Nos. 1,943,341 and 1,943,332, dated January 16, 1934. Then, when the chlorine and/or the ferric chloride attacks the residual ore metal sulfides and forms sulfur chloride, which in the presence of air and ferric oxide acting as a catalyzer will be converted to sulfur trioxide or sulfuric acid, these will be taken up by the alkaline earth metal as a sulfate and thus fixed, and so will be prevented from reacting with the zinc, tin and copper and other desired ore metals to form sulfates. Since the iron is finally converted to the insoluble oxide, the ore metal chloride solutions obtained by leaching the finisher product are substantially free from iron as well as the sulfate radical. This alkaline earth metal compound may be added at various stages of treatment. If the alkaline earth material is added prior to the preliminary roasting step, it should be used in quantity sufficient to protect such ore metals as zinc from being sulfated during the entire process, as determined by analysis of the ore material. For a sulfide ore having 15% of zinc, 1% of lead, 31% of iron and 33% total sulfur, the sulfate radical is fixed throughout the process by using 83 parts of ore to 17 parts of lime. It is to be understood, however, that neither the roasting nor the chloridizing steps are dependent on the use of the alkaline earth material, and that this reagent need not be used for many types of ores in either one or both of these stages.

The three chloridizing stages are accomplished by passing the roasted ore material successively through a series of chloridizing apparatus herein termed the warm or first absorber, the cooled or second absorber, and the finisher. The absorbers and finisher may each comprise any suitable apparatus, such as a long, rotary tube carrying baffles on its inner surface for agitating the substantially dry, pulverulent material and showering it through the reagent gas. The apparatus, as diagrammatically illustrated, is preferably of the type of a Wedge roaster, which has revolving arms arranged to move material from one shelf to another below it, as it is being subjected to the reagent gas, which passes in either a counter-flow or concurrent flow relative to the ore material. Suitable means, such as blowers and rotary valves between the pieces of apparatus, cause the gases to follow the paths indicated on the drawing and not to travel with the ore as it descends through the different zones; but the gas flow may be suitably varied as desired. As illustrated, the gas and ore travel in a counter-current flow in the finisher but concurrent or in the same directions in the two absorbers.

A primary feature of this invention involves the control of the amount of and the removal of the combined and/or free water present in the ore material in the various chloridizing chambers. If, for example, a large percentage of zinc is found in the ore, the zinc chloride, which is a deliquescent material, tends to dissolve in the water of reaction and to form a syrupy or viscous mass which coats the surfaces and pores of the ore particles and forms large lumps which are not readily penetrated by the chloridizing gases. It is, therefore, desirable to control the content of water in the warm absorber. This may be accomplished in various ways, such as by heating the ore material and atmosphere in the warm absorber to a point in the vicinity of 100° C., such as from 80° to 110° C., at which the water is readily vaporized, and the treating gases are passed through the chamber at such a rate that sufficient reaction water is removed from the zone as vapor so that the ore material is kept dry to the touch and remains granular in character.

In this warm absorber, the roasted ore is treated in a substantially dry condition with chloridizing gases, such as hydrochloric acid gas and chlorine, which are capable of converting the oxides of zinc and other metals to chlorides. In the preferred treatment, the roasted ore is subjected to the action of the weak, waste gases containing chlorine, hydrochloric acid gas, ferric chloride vapor, water vapor and air which are products of the other chloridizing zones. Because ferric chloride is not formed preferentially in the presence of a substantial amount of zinc oxide, these gases serve to convert zinc oxide to zinc chloride before the ferric oxide is materially chloridized. If desired, the warm absorber operation may be so controlled that some zinc oxide is left in the material when it leaves this apparatus so as to insure that substantially no ferric chloride is formed during this stage. The waste gases may flow through the warm absorber in either direction. That is, they may be passed in a concurrent or countercurrent flow over the ore material and then outwardly from the apparatus, but it is desirable not to let the waste gases and water vapor pass to the cold absorber, as their moisture content is high enough to cause condensation on the ore and render it wet to a detrimental extent. This warm absorber may be jacketed, and waste heat from the finisher jacket re-used within the jacket walls of the hot absorber to secure the desired temperature. The temperature and other conditions may be so controlled that the iron remains as ferric oxide, associated with the zinc chloride, residual zinc oxide, refractory zinc compounds, lead oxide, lead sulfate, and other ore materials.

It is to be understood that the water vapor and the ore in the warm absorber are so controlled, with reference to the amount of zinc chloride present and to the capacity of the ore particles to physically absorb the chemical water, that the ore remains granular and substantially dry to the touch and the deliquescent zinc chloride does not absorb water from the vapor to produce an ore condition which is not favorable to the ready penetration of the gases. Various expedients may be adopted to aid in keeping the ore granular. For example, stirring it by means of baffles within the tube or by rakes in a shelf apparatus aids in breaking up a material that has been kept dry enough to be friable, as distinguished from one that is rendered plastic or adhesive by condensed water.

The second chloridizing stage involves the conversion of the ferric oxide to ferric chloride in the cooled absorber. This is preferably accomplished by treating the dry ore material by strong hydrochloric acid gas; and the temperature is maintained below 90° C. or at that point at which the ferric chloride crystals will be stable, and particularly with respect to the amount of air which is present, under the conditions of the process. Owing, however, to the fact that ferric chloride crystallizes with from two to six molecules of water, a large portion of the chemical water formed during this step by the reaction of zinc and ferric oxides on hydrochloric acid gas is taken up as water of crystallization, and the product acquires a granular character which is essentially dry to the touch.

It is to be emphasized that the temperature and other conditions in this second absorber are carefully controlled to insure the formation of crystalline ferric chloride and prevent its melting and decomposing or volatilizing, as well as to keep the ore dry to the touch. To this end, the waste gases containing water vapor which come from the finisher, or the last stage of the chloridizing process, are not allowed to contact with the ore in the second absorber but are passed around this second zone to the warm absorber where the water cannot condense and do any damage, because it is removed from the ore material under the temperature conditions there maintained. The ore material passing from the warm absorber directly to the cooled absorber is substantially dry and the cooler temperature conditions found in the cold absorber cannot cause the ore to become wet. Also, the temperature in this second absorber is carefully controlled, such as by means of a jacketed apparatus which may be suitably cooled, as by means of water flowing within the jacket so as to dissipate the heat of reaction. This temperature control insures the formation of the crystalline iron chloride at a temperature at which it remains stable and in a dry and granular condition.

It is an important feature of this process that a considerable part of the refractory compounds, such as zinc sulfide or silicate, are chloridized by direct reaction with ferric chloride in the second absorber where the finely divided ore and the ferric oxide and chloride are in an intimate association. This is particularly the case when the roasting operation has formed compounds of iron with the ore metals, such as zinc ferrate or ferrite or compounds of iron, sulfur and zinc, and the iron and the metals of the refractoy compounds are molecularly associated. This chloridization occurs concurrently with or immediately following the conversion of the ferric oxide to $FeCl_3.xH_2O$. The surrounding atmosphere is one of strong hydrochloric acid gas without a material amount of air present, and the temperature is held below the decomposition point of either of the iron chlorides, hence the reaction is not the same as that in the finisher where the chlorine is released in a nascent condition but involves a lowering of valency of the iron to form ferrous chloride and a direct reaction with the zinc compound. This reaction may proceed so far that the finisher reaction may be either omitted or employed to recover the chlorine combined with iron and to convert the soluble iron chlorides to the insoluble oxides, as may be found necessary. Also, if desired, the ore materials may be so selected and the conditions of the process, including the time permitted for the reaction, may be so controlled that a large amount of ferrous chloride is formed. This product may be suitably recovered, if and where desired, such as by an appropriate water leaching operation prior to the finisher treatment. Thus, the process may be made to serve as a producer of ferrous chloride as well as to chloridize refractory ore values.

The ore material as thus obtained from the second absorber may contain zinc chloride, ferric and ferrous chlorides, lead sulfate and lead chloride, together with some refractory and difficultly chloridized zinc compounds which are amenable to the action of nascent chlorine. This ore may be treated in a final stage in the finisher under conditions which result in the removal of the chlorine combined with the iron and its use in a nascent condition to attack the residual sulfides and other refractory compounds and convert them to chlorides. This is accomplished by gradually heating the ore material to a temperature at which the iron chlorides are not stable and passing the ore and air through the apparatus in a counterflow relation to insure the formation of chlorine gas and the conversion of substantially all the iron chlorides to the insoluble ferric oxide condition.

When the ore material passes into the finisher, it is in a granular and substantially dry condition; but as it is rapidly heated by a countercurrent flow of heated gas in an outer jacket, or in any other suitable manner, the first step near the finisher entrance is that of melting the crystals of the hydrated iron chlorides and dissolving the reagents in their own water of crystalization and so causing an intimate fluid contact with the ore material so that the ferric chloride is able to attack the refractory compounds directly as well as to develop nascent chlorine in close association therewith. Then, as the material is further heated, the water of crystallization is vaporized and the iron chlorides react with the oxygen of the supplied air to form chloridizing gases containing the chlorine element. If the ore is low in iron, the ferric chloride may be added directly to the roasted ore or after partial treatment with chloridizing gases, and the reagent may be in the form of a solution or in a dry form; or iron oxide may be introduced for the purpose at any suitable stage prior to the second absorber treatment.

Since chlorine is a more powerful chloridizing agent then is hydrochloric acid, the air and water vapor in the finisher are so controlled as to minimize the formation of hydrochloric acid and compel the decomposing iron chlorides to give off their combined chlorine largely as nascent chlorine, although a little hydrochloric acid may be formed by the water vapor present at the entrance or upper end of the finisher. This control is accomplished by introducing the air at the lower heated end of the finisher and causing the resultant gases to pass in a countercurrent flow over the ore material and to escape from the upper end of the apparatus, from which they are by-passed to the hot absorber and around the second absorber. Consequently, as the ore mixture is heated at the upper end of the finisher, the water of combination is removed as steam from contact with the iron chloride and the latter decomposes while heated further in the presence of the incoming air. The air is preferably supplied in such an excess that substantially all of the iron chloride is converted to an oxide, and all of the ferous oxide is oxidized to the insoluble ferric form. All of the zinc has been chloridized, but the iron is present substantially wholly as the oxide. A considerable amount of the lead may be converted to lead chloride by this process, although lead sulfate may also be formed during the roasting or chloridization steps.

The temperature in the finisher is raised rapidly to a point well above that at which the iron chlorides decompose or react with air, and preferably to a point in the vicinity of 350° C. and above 250° C. for lead and zinc ores; although the final temperature will be determined largely by the nature of the materials which are present. The temperature may also be so controlled as to dehydrate any gelatinous silicic acid which may have been formed by reaction of the hydrochloric acid on the acid soluble silicates in the roasted ore. A temperature not higher than 365° C. will suffice for this purpose. It is, however, desirable to treat a zinc ore below 350° C. to prevent the formation of oxychlorides. It is to be understood that this process is carried on essentially under low temperature conditions and that the desired ore metal chlorides are held in the ore material and are not volatilized, although in certain cases some highly volatile material may escape with the gases, but will be suitably recovered.

The hydrometallurgical steps for recovering the chloridized materials will be determined in accordance with the nature of the ore treated. In the present instance, the finisher product may be leached with water or other suitable reagent to remove the zinc chloride. Thereafter, the ore material may be treated with a hot, acid-free solution of sodium chloride, which both dissolves the lead chloride and converts to lead chloride any lead sulfate which remains in the residue. The lead chloride may be recovered from the solution in accordance with such methods as are well known in the art. This leaves the ore residue containing ferric oxide, which may now be treated in a suitable way to recover the iron or any other ore metal product which may be contained therein. Any calcium sulfate present will be found in the residue.

Different ores will act in the process in accordance with their own chemical characteristics. Under controlled temperature conditions, one may recover as soluble chlorides such metals as zinc, copper, manganese, cobalt, nickel and cadmium, while iron will go with the residue as the insoluble ferric oxide. This provides a very easy way of separating the desired ore metals from iron.

In view of the above explanation, it will be appreciated that this controlled process involves the following conditions for treating a pulverized or finely divided ore material:

In the warm or first absorber,—
(a) the steam does not condense on the ore to any material extent;
(b) the waste gases containing water vapor which come from the second absorber and finisher may be used without wetting the ore;
(c) zinc and other non-ferrous oxides will be converted to chlorides;
(d) any iron chloride there formed may be decomposed and aid in chloridizing the zinc oxide and sulfide and other compounds;
(e) the deliquescent zinc chloride cannot form a syrupy, viscous or lumpy mass; and
(f) the ore material, though containing some moisture, is granular and dry to the touch and is readily permeated by the gases.

In the second absorber,—
(a) the temperature is held low enough and the amount of air present is so controlled that ferric chloride is formed and remains in intimate contact with the ore material;
(b) the iron chloride absorbs a large part of the chemical water of reaction as water of crystallization;
(c) the material is granular and dry to the touch, and is not wet, syrupy or lumpy because of the presence of condensed water or zinc chloride in solution;
(d) the water vapor from the warm absorber or the finisher is not allowed to pass into the second absorber, nor are the waste gases therefrom allowed to dilute the strong hydrochloric acid gas employed to make ferric chloride; and
(e) the refractory ore metal values are converted to soluble chlorides to a considerable extent by direct reaction with ferric chloride.

In the finisher,—
(a) the iron chlorides melt in their water of crystallization and are carried in solution into intimate contact with the ore for direct reaction therewith;
(b) the water is evaporated and removed from contact with the ore before the iron chloride decomposes; hence it does not react with the iron chloride to produce hydrochloric acid, except to a minor extent, so that the chlorine of the reagent chloride is evolved largely in the nascent condition in intimate association with the ore;
(c) the air passes in a countercurrent flow over the ore and is present in amount sufficient to form chlorine and ferric oxide from the iron chloride;
(d) the ore may be heated to a temperature at which silicic acid is dehydrated, but the temperature is preferably held below that point at which oxychlorides of zinc and other metals are formed or at which the desired chlorides volatilize; and
(e) the temperature is controlled, in accordance with the nature of the ore, to insure an efficient chloridization of the refractory compounds and the recovery of the chlorine of the reagent iron chloride.

Although the development of nascent chlorine in the finisher is desired for economic reasons, it is to be understood that the water control features of this invention apply equally well to a process involving the formation of hydrochloric acid gas in the finisher by the reaction of either ferrous or ferric chloride with water. In either case, the waste chlorine-bearing reagent, whether chlorine or hydrochloric acid gas, and the water vapor are prevented from going from the finisher to the absorber zone, where the iron chloride is being made, and they are preferably by-passed to and employed in any earlier stage.

Also, this invention applies broadly, irrespective of the other steps of the process, to the control of the moisture content of a high zinc ore material during the conversion of zinc oxide to a chloride in the presence of any acid reagent which develops water of reaction, or by any reagent gas containing water vapor, such as may be derived from the finisher zone, or during a subsequent chloridizing stage in which the zinc chloride is present and tends to dissolve in the available water and cause closure of the ore particles. The treatment of a complex ore containing zinc and other desired elements, such as lead, copper and iron, is thus made feasible, and the presence of the zinc is not allowed to hinder or prevent the recovery of the other elements. Hence, many suitable methods may now be employed, which may involve the direct treatment by means of chloridizing gases, or an indirect treatment where a metal chloride, such as calcium or ferric chloride, is caused to react with the zinc oxide and other compounds in the presence of water or any acid which develops water, as will now be understood by one skilled in the art.

The claims are to be interpreted as limited to a low temperature process, as distinguished from one which depends upon high temperature reactions between the reagent and the ore metal values or volatilization of the desired chlorides, such as the salt roasting or chloride volatilization methods, and particularly as applying only to those low temperature conditions under which the desired ore metal chlorides are not removed by volatilization but are formed in situ and remain in the ore material until later leached therefrom, as by means of water or a salt solution. The water control features of this invention apply only to that type of process which is adapted for treating an ore in a substantially dry condition and in which water would be normally present in the ore or the reagent gas or formed by chemical reaction therebetween and would tend to cause detrimental results, were the water content not controlled as herein defined.

This case is a continuation in part of my copending application Serial No. 503,524 filed December 19, 1930.

Having thus described my invention, what I claim as new and desire to secure by Letters Patent is:

1. The method of chloridizing an ore material containing a high zinc content comprising the steps of treating it in a granular condition and at a low temperature with a chloridizing reagent and converting zinc oxide to a chloride under conditions wherein the ore or the surrounding gas contains or develops water, and simultaneously with the chloridizing step removing the water as vapor to such an extent that, with reference to the capacity of the ore material to absorb the water, there will be insufficient water available to produce, by solution of the deliquescent zinc chloride, a viscous, syrupy or lumpy condition, and thereby causing the ore material to remain substantially dry, granular and permeable to reagent fluids, and subsequently treating the dry ore material with a gaseous reagent and chloridizing further ore values without interference by said water and zinc chloride, although the zinc chloride is present in a sufficiently high content and the chloridizing process is such that this detrimental result would occur if the water content of the ore were not thus controlled.

2. The method of treating an ore material containing a high content of zinc oxide according to claim 1 in which the material is treated with a current of a gaseous chloridizing reagent which contains or develops water during the process, and the temperature of the ore material and the rate of gas flow over the material are so controlled that sufficient water is removed from the chloridizing zone so that the ore remains substantially dry and is readily permeated by the gas.

3. The method of chloridizing an ore material containing refractory values and a high content of zinc oxide comprising the steps of treating it in a granular condition and at a low temperature with a gas containing hydrochloric acid to form zinc chloride and water and simultaneously evaporating and removing the water of reaction to such an extent that, with reference to the capacity of the ore material to absorb the water, there will be insufficient water available to produce, by solution of the deliquescent zinc chloride, a viscous, syrupy or lumpy condition which materially hinders the penetration of the reagent gas, and the ore material remains in a substantially dry and granular condition, and subsequently treating the gas-permeable material with a chloridizing gaseous reagent and converting the refractory values to chlorides.

4. The method of chloridizing an oxidized ore containing zinc and iron oxides characterized in that the ore in a granular condition is treated in separate stages, first with a chloridizing gas to convert zinc oxide to a chloride and then with hydrochloric acid gas to form iron chloride, and in that the water of reaction is evaporated and removed to such an extent, with reference to the capacity of the ore material to absorb it and the iron chloride to take it up as water of crystallization, that the ore material remains substantially dry, granular and gas-permeable and the deliquescent zinc chloride is prevented from developing a viscous or lumpy condition although present in amount sufficient therefor.

5. The method according to claim 4 in which the ore is maintained at a temperature between 80° and 110° C. during the initial conversion of zinc oxide to the chloride and the chloridizing gas is passed over the ore at such a rate that sufficient water is removed as vapor so that the ore remains substantially dry, granular and gas permeable.

6. The method of claim 4 in which the ore is continuously agitated as it is passed successively through the two chloridizing zones relative to a flow of gas therein, and the chloridizing gas is introduced into each zone at such a rate relative to the temperature of the material therein, that the desired chloride is formed and the water is removed or absorbed so that the ore material remains substantially dry and granular.

7. The method of chloridizing an oxidized zinc ore comprising the steps of treating the ore in a substantially dry condition with a chloridizing gas containing or developing water and converting zinc oxide to the chloride, and thereafter heating the ore material in intimate association with iron chloride and developing therefrom a chloridizing gas containing the chlorine element which further chloridizes the ore, and characterized by the fact that any free or combined water which may be present during the initial treatment with the chloridizing gas is removed as vapor to such an extent, with reference to the capacity of the ore material to absorb it, that the ore remains substantially dry and granular in character and the deliquescent zinc chloride is prevented from forming a syrupy, viscous or lumpy mass although present in amount sufficient to materially hinder the penetration of the gaseous reagents.

8. The method of chloridizing an oxidized ore containing zinc oxide according to claim 3, in which the ore is treated with gaseous reagents containing or developing water, while the temperature is maintained between 80° and 110° C. and the gases are passed over the ore at such a rate as to evaporate and remove sufficient water so as to keep the ore substantially dry.

9. The method of chloridizing an oxidized ore comprising the steps of treating the material initially with a chloridizing agent which contains or develops water and converting an ore metal oxide to a chloride, and then treating it in the presence of ferric oxide with hydrochloric acid gas to form ferric chloride therein, while preventing waste gases and moisture from all other stages from contacting with the ore during the formation of the ferric chloride.

10. The method of chloridizing a complex oxidized ore comprising the steps of initially treating the ore in a first stage with a chloridizing agent to convert an ore metal oxide therein to a chloride, providing an intermixture of the ore material with ferrice oxide, treating the ore in a second stage to convert the ferric oxide to ferric chloride, and subsequently passing the ore material through a third stage reaction chamber while heating it in the presence of air and under controlled temperature and atmospheric conditions to cause the formation therein of ferric oxide and a chlorine-bearing gaseous reagent for chloridizing refractory values in the ore, and preventing the water and/or the waste gases evolved during the last stage from contacting with the ore material during the formation of the ferric chloride.

11. The method of claim 10 in which the waste gases and water vapor from the third stage are by-passed around the second stage and are used in the first stage to treat the ore.

12. The method of chlorodizing an ore material containing a residual sulfide or other chloridizable refractory compound comprising the steps of providing a finely divided intermixture of the ore material with sufficient ferric oxide to cause the direct chloridization of said compound, treating the material in a substantially dry condition with strong hydrochloric acid while excluding air therefrom, and maintaining a temperature below that point at which crystalline hydrated ferric chloride will melt or decompose under the conditions of the process, while controlling the water content of the ore so as to cause water of reaction to be absorbed and said crystalline compound to be formed within a substantially dry granular ore material and concurrently therewith causing the ferric chloride to react directly with the chloridizable compound at a low temperature to form a chloride thereof with a resultant reduction of the ferric chloride to the ferrous form, and thereafter separating the desired ore-metal chloride from the iron compounds and ore residue.

13. The method of chloridizing an oxidized ore material containing zinc oxide and zinc sulfide or other chloridizable refractory compound comprising the steps of initially treating the ore material with a chloridizing gas to convert zinc oxide to the chloride and provide a substantially dry ore material, and then chloridizing the ore material in intermixture with sufficient ferric oxide for the direct chloridization of the refractory compound by treating it with strong hydrochloric acid gas and maintaining temperature, moisture and atmospheric conditions which cause water of reaction to be taken up as water of crystallization and the ore material to be in a substantially dry condition, with the resultant production of crystalline hydrated ferric chloride in intimate association with the chloridizable compounds, and concurrently causing the reduction of ferric chloride to the ferrous form by direct reaction at a low temperature with the refractory compound and its conversion to a chloride, and thereafter separating the soluble metal chloride from the residue.

14. The method of claim 12 in which the ore material containing the residual ferrous and ferric chlorides and associated water is thereafter heated with air to form ferric oxide and a gas containing the chlorine atom which serves to chloridize the unconverted refractory compounds.

15. The method of chloridizing an ore material and making ferrous chloride comprising the steps of treating a chloridizable ore metal compound intermixed with ferric oxide by means of strong hydrochloric acid gas, while excluding any material amount of diluting gases, and concurrently causing the formation of crystalline hydrated ferric chloride and its reaction with and the chloridization of said compound with the resultant production of ferrous chloride, and thereafter dissolving and recovering said ferrous chloride from the ore material.

16. The method of chloridizing a complex oxidized ore containing refractory zinc compounds comprising the steps of treating the ore in intimate mixture with ferric oxide by means of strong hydrochloric acid gas while excluding air therefrom and controlling the temperature so as to cause the concurrent formation of crystalline hydrated ferric chloride throughout the ore mass and the conversion of a refractory zinc compound to the chloride with the resultant formation of ferrous chloride within the ore, and thereafter heating the ore to decompose the residual ferric and ferrous chlorides and produce a chlorine-bearing gaseous reagent and causing said gas to chloridize the ore to a further extent.

17. A method of treating a roasted ore containing residual sulfides and other refractory compounds in accordance with claim 12 in which the ore material containing the crystalline iron chloride is heated first to melt it in its water of crystallization and then to evaporate the water and finally to a temperature at which the iron chlorides are not stable, while the water vapor is removed from contact with the ore material and sufficient air is supplied to form ferric oxide and to insure that the combined chlorine of the iron chlorides is evolved largely as nascent chlorine, which serves to chloridize the refractory compounds.

18. The method of chloridizing an ore containing zinc and ferric oxides in which the ore is treated with gaseous reagents in two stages, first to chloridize the zinc oxide under conditions which are not favorable to the formation of ferric chloride, and thereafter with strong hydrochloric acid gas under temperature and atmospheric conditions which cause the production of crystalline hydrated ferric chloride within the ore material.

19. The method of claim 18 in which the ore is treated in a first zone with a chloridizing gas acting in the presence of air and at a temperature which is not favorable to the formation of ferric chloride, while the water of reaction is removed to such an extent that the ore material is substantially dry when fed to the second zone, and in which the second zone chloridization of the ferric chloride is effected with the temperature and atmosphere so controlled that the ferric chloride is produced in situ and the water of reaction is absorbed, so that the ore material remains dry and granular in character.

20. The method of chloridizing a complex oxidized zinc and lead bearing ore comprising the steps of providing an intimate, finely divided mixture thereof with ferric oxide, treating the material with a chloridizing agent to form zinc chloride from any zinc oxide present and maintaining the material in a substantially dry, gas-permeable condition, treating the mixture with strong hydrochloric acid gas and controlling the temperature, with respect to the amount of air present, so as to form crystalline hydrated ferric chloride in close association with a substantially dry granular ore material, then heating the material with air to a temperature not substantially higher than 350° C. so as to develop nascent chlorine from the iron chlorides present, and thereafter dissolving the soluble lead and zinc salts from the ore material.

21. The method of chloridizing an oxidized complex ore containing oxides and refractory compounds of ore metals comprising the steps of passing the ore and a chloridizing gas through an absorber in a concurrent flow and converting an oxide to a chloride, then passing the material intermixed with iron oxide through a second absorber and introducing therein a stream of strong hydrochloric acid gas to form iron chloride therein, and finally passing the material through a finisher in counterflow relation to a current of air, while heating the material to a temperature at which the iron chlorides are not stable and producing ferric oxide and a chloridizing gas therefrom.

22. The method of chloridizing a complex sulfide ore containing iron and zinc sulfides comprising the steps of roasting the ore under low temperature oxidizing conditions which produce ferric oxide and leave the ore in a granular, non-sintered condition, then treating the roasted ore in separate stages with chloridizing gases which form an ore metal chloride and water, the first stage being carried on under oxidizing and temperature conditions in the vicinity of 100° C., which are not suitable for forming ferric chloride but which serve to evaporate and remove sufficient water of reaction, with reference to the capacity of the ore material to absorb it, that the ore remains in a substantially dry, granular condition, and the second stage involving cooling the ore material and maintaining temperature and atmospheric conditions which are favorable to the formation of crystalline, hydrated ferric chloride from ferric oxide in the ore material, the water vapor derived from other stages being prevented from contacting with and wetting the ore during said second stage by condensation thereon, and causing a further chloridization of the ore by means of said ferric chloride.

23. The method of chloridizing a roasted complex sulfide ore containing oxides, residual sulfides and other refractory compounds of ore metals comprising the steps of passing the dry, granular roasted ore containing ferric oxide progressively through a first stage apparatus where it is subjected to a current of a chloridizing gas which converts an ore metal oxide to a chloride and forms water, while the temperature conditions and rate of gas flow are so controlled as to result in the evaporation and removal of sufficient water of reaction to maintain the ore in a substantially dry, granular, gas-permeable condition, then passing the material through a second stage apparatus into which is introduced strong hydrochloric acid gas, while the temperature is controlled, with respect to the amount of air present, so as to cause the conversion of the ferric oxide to crystalline, hydrated ferric chloride and its concurrent reduction to ferrous chloride by reaction with chloridizable compounds, after which the ore material is heated in a third stage first to melt the iron chloride crystals and then to a temperature at which the ferric and ferrous chlorides present are not stable, while the water is evaporated and removed and air is supplied in amount sufficient to form nascent chlorine and ferric oxide.

24. The method of claim 23 in which the ore is initially chloridized by the waste gases derived from later stages in the process and strong hydrochloric acid gas is employed solely in the production of the ferric chloride crystals and the waste gases and the vaporized water from the final stage are prevented from contacting with and wetting the ore in the second stage or from diluting the strong hydrochloric acid gas employed in making the iron chloride.

25. The method of chloridizing a roasted complex sulfide ore containing the oxides, sulfides and other refractory compounds of the ore metals comprising the steps of progressively passing the roasted ore containing iron oxide and a stream of a chloridizing gas through a warm absorber in a concurrent flow and causing the formation of an ore metal chloride and water, while the temperature conditions are so controlled that sufficient water is evaporated and carried away by the gas stream that the ore remains in a substantially dry, granular, gas-permeable condition, then passing the treated ore through a second absorber and treating it with a stream of strong hydrochloric acid, while preventing access thereto of water vapor and the weak gases from the other stages and cooling the absorber to provide a temperature favorable to the formation of crystalline hydrated iron chloride and its chloridization of the ore metal compounds, and finally passing the material into and through a finisher where it is subjected to a countercurrent flow of air and is heated to melt the iron chloride crystals and vaporize and remove the water and then to a temperature at which the iron chlorides are not stable, thereby forming nascent chlorine and iron oxide from the iron chlorides and chloridizing the refractory values.

26. The method of chloridizing an ore material containing a high content of zinc oxide comprising the steps of treating it in a granular substantially dry condition and at a low temperature with a gas containing hydrochloric acid and simultaneously removing from the ore material as a vapor sufficient water of reaction so that, with reference to the capacity of the ore material to absorb the water, the ore will remain granular in character and there will be insufficient water condensed on the ore to produce by solution of the deliquescent zinc chloride a condition which materially hinders the penetration of the reagent gas for a substantially complete chloridization of the zinc oxide and thereafter treating the resultant granular product with a ragent which permeates it and serves to solubilize the ore values.

27. The method of chloridizing an ore containing a high content of zinc sulfide comprising the steps of roasting the ore with air and providing a granular, gas permeable material containing a large amount of zinc oxide, and treating the dry material at a low temperature with a gas containing hydrochloric acid while controlling the temperature and simultaneously removing water from the reaction zone to such an extent that, with reference to the capacity of the ore material to absorb the water of reaction, there will be insufficient water condensed on the ore to produce by solution of the deliquescent zinc chloride a syrupy condition which materially hinders the penetration of the reagent gas, and thereby chloridizing the ore material in a substantially dry granular condition, and thereafter leaching the zinc chloride from the permeable material and recovering the same.

THOMAS A. MITCHELL.